INVENTORS
LESTER M. SPANDORFER
ALBERT B. TONIK
SHIMON EVEN

BY William E. Cleaver
ATTORNEY 3,248,573

PLANAR INTERCONNECTING NETWORK AVOIDING SIGNAL PATH CROSSOVERS

Lester M. Spandorfer, Cheltenham, and Albert B. Tonik, Dresher, Pa., and Shimon Even, Cambridge, Mass., assignors to Sperry Rand Corporation, New York, N.Y., a corporation of Delaware Filed Feb. 21, 1964, Ser. No. 346,570
6 Claims. (Cl. 307—88.5)

This invention relates to interconnecting arrangements for energy transmission systems, and, in particular, to planar interconnecting arrangements.

The present invention is described in connection with an electrical system for simplicity but it should be noted that the invention can be employed with other energy transmission systems such as light systems, pneumatic systems and the like.

When a number of electrical components, such as electrical circuit cards in a computer, are joined together to form a system, these components must be interconnected with one another.

The procedure for interconnecting these components has followed several techniques. In each of these techniques the circuit component sub-assemblies have been connected onto one side of an assembly board and the interconnecting wires are connected on the other side of the assembly board, often referred to as the backboard.

Probably the most straightforward technique is that of hand-wiring one terminal with another on the backboard side, and indeed this has been the procedure in many prior art electrical systems such as computers. It takes very little imagination to envision that the hand wiring of such electrical terminals demands that a great deal of space be allotted to house the many wires which are criss-crossed in any random pattern from one terminal to another. It is also easy to envision that the time consumed in hand wiring a system is significant, and the problems which arise in servicing such computers, because of the random inter-meshing of the wires, are manyfold.

The initial improvement on such a random hand wiring scheme resulted in grouping the wires into cable form. The cables provided a little more semblance of organization than with the heretofore described random wiring. Nonetheless even the cable technique demanded a great deal of space and a great deal of time. The next step in the improvement of the interconnecting schemes was the introduction of multi-layered printed circuits. The multi-layered printed circuit arrangement provides for interconnecting the circuit cards or circuit sub-assemblies by providing printed circuits from one terminal to another, or from certain terminals to other terminals on one layer and from yet other terminals to associated terminals on another layer. This arrangement provides a multi-layered package secured to the backboard in place of the wires just described. If a component circuit terminal to be connected were to go to some other component circuit terminal but their connection would require a crossover on one layer, the interconnecting printed circuits would provide connections through the substrates, upon which they were bonded, to provide an interconnecting path without a crossover. While such schemes do have merit, the connections through the substrates have proven to be unreliable in a number of applications, and therefore have been the subject of much research for improvement.

If the multi-layer printed circuit arrangement is considered for the moment, it will be realized that a large number of the circuit portions which pass through the substrates are portions which represent essential cross-overs of the connecting wires or connecting media although some of the interconnections through the substrates are the result of using wires of finite widths which won't fit on one surface. In other words, when terminals in a system are being connected, one to another (even though the connections are carefully planned so that the connections between the terminals will not include unnecessary cross-overs), there always result situations where the only way by which one terminal can be connected with a second terminal is to have the connecting wire therebetween actually cross over or lie across another wire connecting two other points. In a multi-layer printed circuit arrangement the essential crossovers are fabricated by providing conducting paths through the substrates. However, the solution itself, i.e., the conducting paths through the substrates, produces a somewhat undesirable characteristic in that the metal through the substrates is difficult to bond with the circuits lying on top of the substrate. Therefore, the multi-layer printed circuit schemes according to the present state of the art have proven to be unreliable in a number of applications.

In contrast, the present invention provides a means for interconnecting a plurality of terminals to form a system wherein the interconnection is on one plane, and there are no crossovers.

Accordingly, it is an object of the present invention to provide an improved interconnecting network for an energy transmitting system, and in a preferred embodiment for an electrical system.

It is a further object of the present invention to provide an interconnecting network for an energy transmitting system which is planar and operates without any crossovers of the media respectively connecting two pairs of terminals at an essential crossover point.

In accordance with a feature of the present invention at each essential crossover location there is provided a logic network which enables the terminals of a first associated pair of terminals to be connected to one another without requiring that the medium which connects them should cross over the medium which connects the terminals of a second associated pair of terminals.

In accordance with the foregoing feature of the present invention the logic network, last mentioned, effects an energy transmission between adjacent terminals, hereinafter referred to as a right angular energy transmission, to simulate or effect a transmission of energy between opposite terminals.

The above mentioned and other features and objects of this invention will become more apparent by reference to the following description of an embodiment of the invention taken in conjunction with the accompanying drawings wherein.

When an electrical system is interconnected, i.e., when the various electrical components are wired together to form a system, the connecting leads are positioned such that a number of essential crossovers result. An essential crossover should be understood to mean a necessary overlaying (or an apparent necessary overlaying) of a first lead on a second lead in order that the first lead can connect two electrical terminals which lie along a first imaginary line which cuts a second imaginary line lying between the two terminals that the second lead connects. When the interconnection network of an electrical system is first laid out, it may be that many leads cross over one another, but by re-routing the leads may of these crossovers can be eliminated, allowing only the essential crossovers to remain. Essential crossovers may be only apparently necessary because the present invention provides for their elimination.

Figure 1:
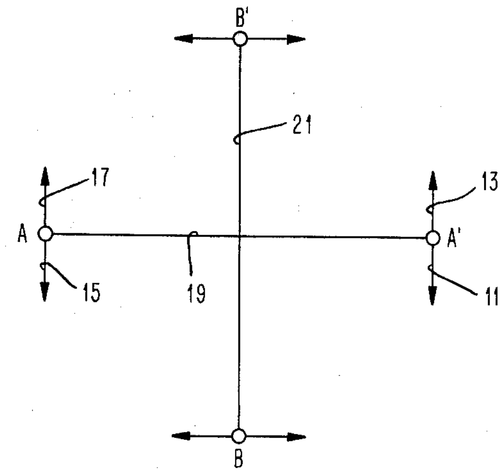
FIGURE 1 is a schematic diagram of an essential crossover of connecting media between four terminals.

The foregoing concept can be better understood by examining FIGURE 1 which shows four terminals A–A′ and B–B′. Assume that when the circuit cards (groups of electrical components) of a computer have been mounted on a single plane and wired together there remains four terminals or printed circuit leads A–A′ and B–B′ unconnected. Assume that this signal system necessitates that A be connected to A′ and B be connected to B′ in order to properly complete in the interconnection of the circuit cards. Further assume that no other paths are possible. In other words, the circuity wired to the terminals A–A′ and B–B′ is such that if the lead 21 were relocated to connect B–B′ by circumventing the terminal A this would result in crossovers. For example, if the lead 21 were relocated to the south of terminal A′, it would cross over the leads 11 and 13 which are also connected to the terminal A′, and in like manner if the lead 21 were relocated to the north to circumvent terminal A, it would cross over the lines 15 and 17. In FIGURE 1, it can be seen that if the lead 19 were relocated to circumvent B and B′, is too would cut across other leads. Therefore, we must assume that in the system represented by FIGURE 1 the only connection between B and B′ and A and A′ which can be made is a connection as shown and would require a cross over which we have defined as an essential crossover.

As suggested earlier it should be noted here that although in the illustrative embodiment, the lines 19 and 21 have been identified as electrical wires, these lines represent any form of energy transmission media, such as ducts to transmit air in a pneumatic logic system.

Presently crossovers are handled in a point-to-point wiring scheme on the backboard by simply overlaying the connector media, the wires. Such an arrangement does give rise to an occasional short circuit, and an occasional spurious signal, but the more undesirable aspect of this arrangement is human error and difficulty in fabricating such an arrangement. The cross-over, per se, gives rise to no greater problem (other than those mentioned above) than the hand wiring scheme as a whole. The hand wiring schemes are space consuming; lead to human errors in making such connections; are difficult to service; and as the available space shrinks (as with airborne equipment) are almost impossible to fabricate. Hence the interconnecting art has moved to printed circuit multi-layer devices to take the place of the interconnecting wires.

In printed circuit multi-layer schemes the cross-over, per se, often becomes a problem. There are serious problems in the reliability in forming a conducting path through a substrate, or substrates, to complete connections from one terminal to another via a lower layer or a layer lying away from the layer adjacent the backboard. A great deal of engineering and research effort is being spent to improve this reliability. However, multi-layer printed circuit wiring, whatever its advantages over hand wiring, does not appear to be feasible as a means for interconnecting integrated circuits especially when the integrated circuits are formed as one integral mass. It would be ideal if integral circuits, represented by wafers of semi-conductor material could be connected together on the same plane to which they are mounted.

Consequently, the present invention deals with the problem of how to connect the terminals B to B′ and A to A′ as viewed in FIGURE 1 without employing the cross-over shown in FIGURE 1. As mentioned earlier it is to be undestood that while the present invention is described in connection with electrical circuits, other forms of energy transmission can take advantage of this invention. For instance, in a pneumatic system the present invention would have real utility in enabling a stream of air to pass from B to B′ and a second stream of air to pass from A to A′ without having to tunnel a pair of ducts at the cross-over point.

Returning to the description of the electrical mode, the logic circuit to connect the four terminals A–A′, and B–B′ will be described as being made up of three exclusive OR gates which in turn will be described as being made of NAND gates. However, it should be understood that other forms of logic can be used to accomplish the basic principle of a right angular transmission of a signal, or signals, to accomplish an effective transmission of signals through a cross-over position. To be more specific, the present invention while described in connection with exclusive OR gates and NAND gates should be considered as not limited to these logical circuit arrangements.

Figures 2, 3:
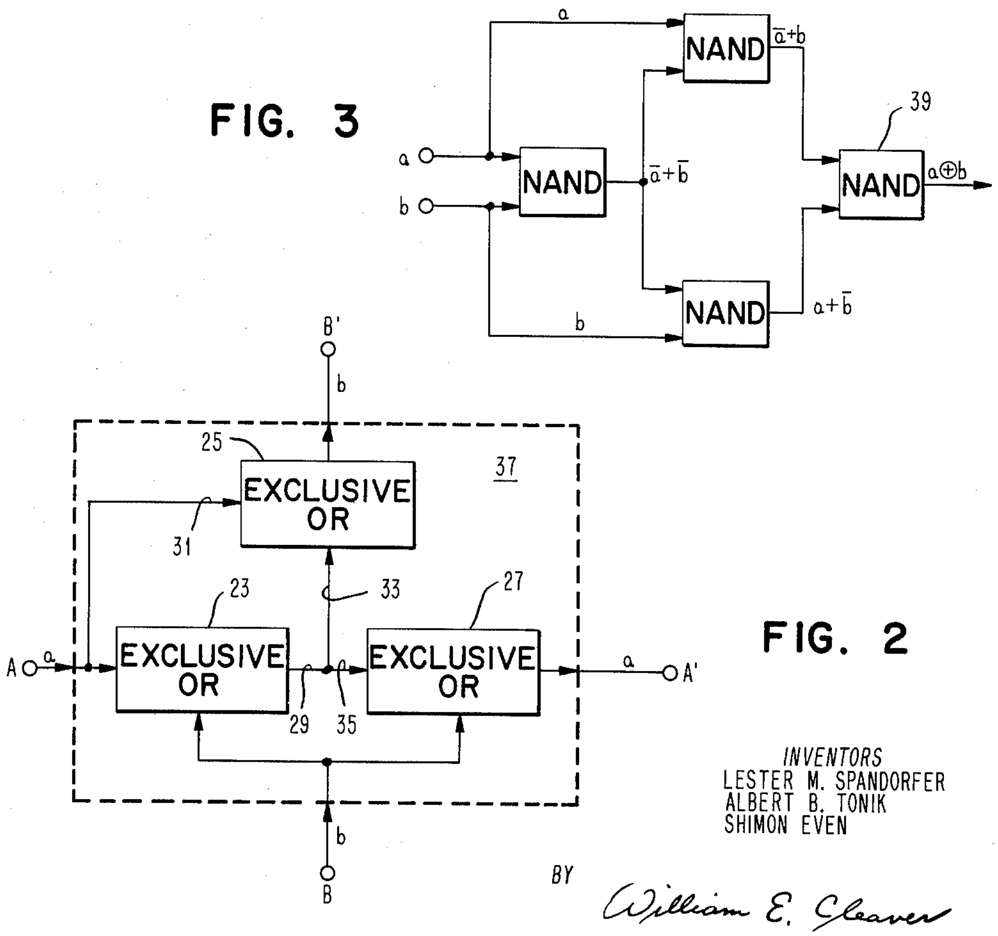
FIGURE 2 is a schematic diagram of a logic device to be connected between four terminals of an essential crossover.
FIGURE 3 is a schematic diagram of one embodiment of a device which can be employed for the logic elements of FIGURE 2.

Consider FIGURE 2 which shows a typical arrangement to be included in the logical device connecting the terminals A–A′ and B–B′. In the logical block 37 there are shown three exclusive OR gates 23, 25 and 27. It will be recalled that the truth table for an exclusive OR gate is as follows.

| | | | | | |
|---|---|---|---|---|---|
| Input | a | 0 | 1 | 0 | 1 |
| | b | 0 | 0 | 1 | 1 |
| Output | s | 0 | 1 | 1 | 0 |

In accordance with the foregoing truth table, if a signal *a* is applied to the exclusive OR gate 23 and there is no signal *b* present, then the signal *a* will appear on the lines 29, 31, 33 and 35. When the signal *a*, appears on lines 31 and 33 the exclusive OR gate 25 will not produce an output to the terminal B′ in accordance with the truth table. On the other hand when the signal *a* appears on line 35 and is transmitted to the exclusive OR gate 27, which at the same time is not subject to the signal *b*, there will be produced an output signal from the exclusive OR gate 27 to the terminal A′. Accordingly an *a* signal can be transmitted from the terminal A to the terminal A′.

In a symmetrical fashion it can be found that when the signal *b* is transmitted from the terminal B to the exclusive OR gates 23 and 27 it will find its way through the network to the terminal B′ and will not be transmitted to the terminal A′. Hence a signal *b*, in the absence of a signal *a*, can be transmitted from terminal B to terminal B′. The last case we need consider is what happens when the signals *a* and *b* are transmitted simultaneously. If the signals *a* and *b* are present, the exclusive OR gate 23 is inhibited and there is no output signal on the lines 29, 33 and 35. However, an *a* signal is transmitted on line 31 to the exclusive OR gate 25, which has this *a* signal as the only input thereto, and therefore this signal is transmitted to the terminal B′. In a similar manner, the siganl *b* is transmitted to the exclusive OR gate 27, which has only this one input signal thereto and therefore is transmitted to the terminal A′. The above described right-angular signal transmission effectively transmits a signal from B to B′ and from A to A′ simultaneously because the signals, per se, have no identification other than a uniform pulse and the pulses applied and transmitted throughout the system are equal. Hence while the *a* signal actually activates the exclusive OR gate 25 to produce a *b* signal at B′ the circuitry receiving the signal at B′ receives the signal as a *b* signal. In a like manner the circuitry at terminal A′ receives the signal thereat as an *a* signal, although it has been initiated by a *b* signal. It should be clearly understood that the only time that a signal is transmitted to terminal B′ as a result of an *a* signal initiation is when, in fact, a *b* signal has been transmitted from the terminal B, and hence the effective transmission of the signal from B to B′ and from A to A′ is in order.

It becomes clear from the foregoing that the logic circuitry 37 can be connected for every essential cross-over position and provide a planar connection between any four terminals defining the essential cross-over position in a system.

In order to carry the fabrication of the logic design one step further let us consider what forms of circuitry might be employed to provide a planar (that is, no cross-over) exclusive OR gate. Consider the circuitry of FIGURE 3. FIGURE 3 shows four NAND gates which are connected in a pattern to provide an exclusive OR gate. The NAND gates can be the diode-transistor logic as disclosed in U.S. patent application No. 524,062, now abandoned. The Boolean Algebra symbols are shown on the leads from the NAND gates which eventually provide an output from NAND gate 39 when there is an input of either *a* or *b*, but not in the presence or absence of these input signals. The circuitry shown in FIGURE 3 is shown by way of example only, and should not be considered as the only manner in which a planar exclusive OR gate can be designed. The use of the NAND gate in the circuitry of FIGURE 3 seems to be in order since the universality of the NAND gate is widely known, and widely used, in the fabrication of complete computer circuits.

Figure 4:
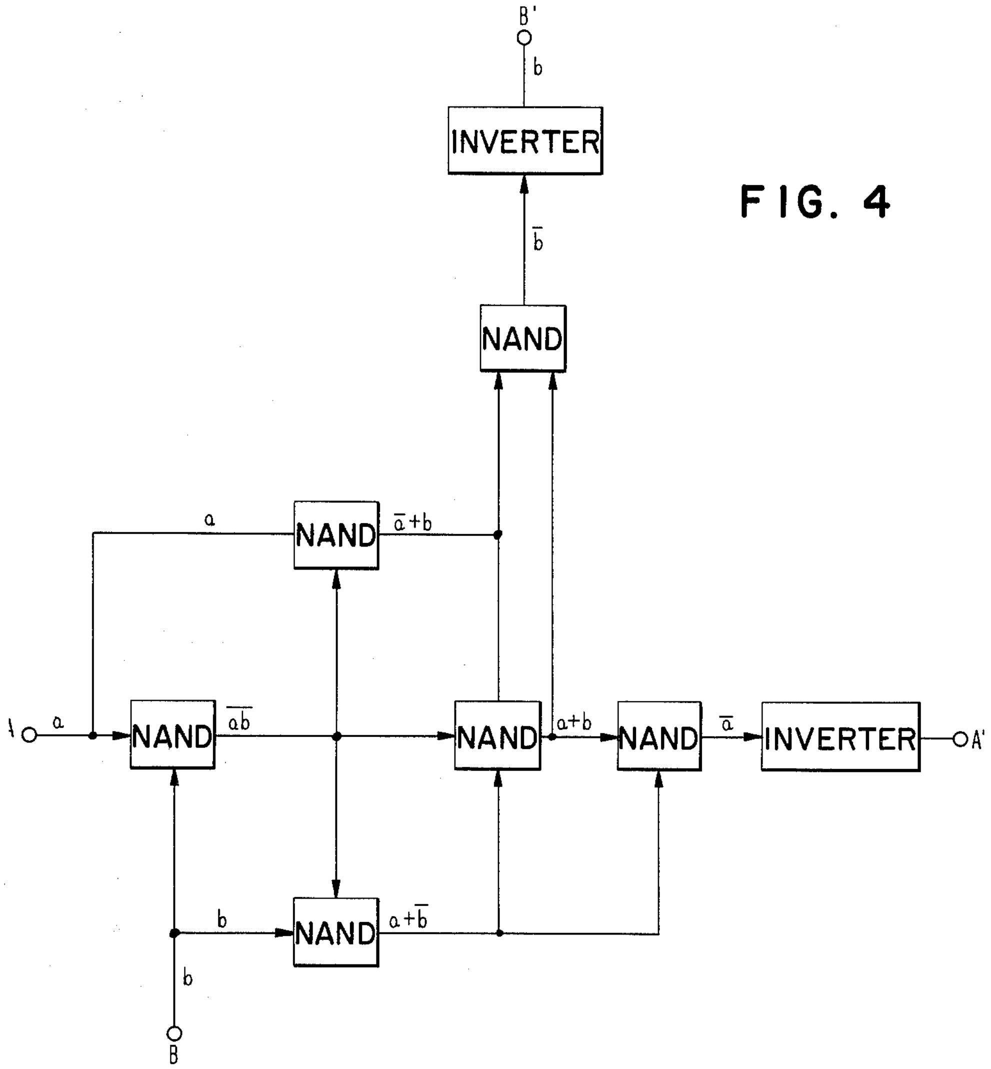
FIGURE 4 is a schematic diagram of a second embodiment of a device which can be employed for the logic elements of FIGURE 2.

In another form of logic a substitute for three exclusive OR gates of FIGURE 2 can be developed with eight NAND gates or six NAND gates and two inverters as shown in FIGURE 4. The Boolean Algebra notations are shown in FIGURE 4 on the output lines of the logic devices, and can be readily followed to show that a signal *b* can be transmitted to B′ from B at the same time that signal *a* can be transmitted to A′ from A without a crossover.

According then to the present invention there can be employed at each essential cross-over in an interconnection network a logic device which will effect a right angle energy signal transmission between adjacent terminals of a four-terminal essential cross-over position in order to effect an energy signal transmission between the opposite terminals of the four-terminal array. Such an arrangement makes it possible to simply and economically fabricate an entire interconnecting system on one surface. The techniques of printed circuits are well known and the present invention lends itself to fabricating the entire interconnecting network (without the logic devices) by printed circuits on one surface of a substrate. It follows that the requirement of providing backboard wiring or substituting multilayered printed circuits therefor can be eliminated. Circuit components and sub-assemblies can be connected together via the same plane upon which they are mounted. Such an arrangement lends itself to great utility with respect to integrated circuits wherein the sub-assemblies are fabricated as wafers of semiconductor material.

While the foregoing description sets forth a principle of the invention in connection with specific apparatus, it is to be clearly understood that this description is made only by way of example and not as a limitation to the scope of the invention as set forth in the objects thereof and in the accompanying claims.

The embodiments of the invention in which an exclusive property or privilege is claimed are defined as follows:

1. A planar network interconnecting a plurality of terminals in an intelligence signal transmission system without employing any cross-overs of the media connecting the terminals. Comprising:

(a) a plurality of terminals to be interconnected with one another according to a prescribed plan;

(b) connecting media interconnecting said plurality of terminals in such a way as to create at least one essential cross-over position between at least four terminals, said four terminals being divided into two pairs of associated terminals;

(c) logic circuit means connected to said four terminals at said at least one essential cross-over position to provide planar transmission paths for intelligence signals between said four terminals in order to transmit intelligence signals exclusively between the two terminals of one of said pairs and to conduct intelligence signals exclusively between the two terminals of the other said pairs, said logic circuit means permitting said intelligence signals to be conducted simultaneously and alternatively individually without having the intelligence signals cross-over the respective paths of each other.

2. A planar network interconnecting a plurality of terminals in an intelligence signal system without employing any cross-over of the connecting leads which connect the terminals comprising:

(a) a plurality of terminals to be interconnected with one another according to a prescribed plan, said plurality of terminals including at least first, second, third and fourth terminals;

(b) connecting leads interconnecting said plurality of terminals in such a way as to create an apparent necessity of connecting said first terminal with said second terminal by virtue of a first connecting lead that overlays a second connecting lead which connects said third terminal to said fourth terminal;

(c) logic circuit means connected to said first, second, third and fourth terminals in order to provide a planar circuit connection thereat which enables intelligence signals to be transmitted exclusively between said first and second terminals and exclusively between said third and fourth terminals either simultaneously or individually without having the circuit path for said intelligence signals between said first and second terminals crossover the circuit path between said third and fourth terminals.

3. A planar network according to claim 2 wherein said logic circuit means comprises three exclusive OR gates.

4. A planar network according to claim 2 wherein said connecting leads comprise printed circuitry bonded to substrates.

5. A planar network according to claim 3 wherein said exclusive OR gates are each composed of four NAND gates.

6. A planar network interconnecting a plurality of terminals in an intelligence signal transmission system without employing a crossover of the leads connecting the terminals comprising:

(a) a plurality of terminals to be interconnected with one another according to a prescribed plan, said plurality of terminals including at least first, second, third and fourth terminals which last-mentioned terminals define a rectangle and wherein said first terminal lies adjacent to said third and four terminals and opposite to said second terminal;

(b) connecting leads interconnecting said plurality of terminals in such a way as to create an apparent necessity of connecting said first terminal to said second terminal with a first connecting lead that overlays a second connecting lead which connects said third terminal to said fourth terminal;

(c) logic circuit means connected to said first, second, third and fourth terminals in order to provide a planar connection therebetween, said logic circuit means directing a first signal applied to said first terminal to said second terminal when there is no second signal simultaneously applied to said fourth terminal and directing said first signal to said third terminal when there is a second signal simultaneously applied to said fourth terminal, and symmetrically said logic circuit means directing a first signal applied to said fourth terminal to said third terminal when there is no second signal simultaneously applied to said first terminal but directing said first signal to said second terminal when there is a second signal applied to said first terminal.

No references cited.

ARTHUR GAUSS, *Primary Examiner.*

I. C. EDELL, *Assistant Examiner.*